United States Patent
Kang (10) Patent No.: US 8,799,185 B2
(45) Date of Patent: Aug. 5, 2014

(54) SYSTEM FOR CALCULATING AND COLLECTING ELECTRIC CHARGE FEE FOR ELECTRIC VEHICLE

(75) Inventor: Seong Gyu Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 795 days.

(21) Appl. No.: 12/500,903

(22) Filed: Jul. 10, 2009

(65) Prior Publication Data

US 2010/0010685 A1   Jan. 14, 2010

(30) Foreign Application Priority Data

Jul. 10, 2008   (KR) .......................... 10-2008-0067235

(51) Int. Cl.
| | |
|---|---|
| G01R 11/56 | (2006.01) |
| G01R 21/133 | (2006.01) |
| G06F 17/00 | (2006.01) |
| G06Q 10/00 | (2012.01) |

(52) U.S. Cl.
USPC .......................................... 705/412; 705/1.1

(58) Field of Classification Search
USPC .......................... 705/1.1, 7.11–7.42, 400–412
See application file for complete search history.

(56) References Cited

U.S. PATENT DOCUMENTS 5,548,200 A * 8/1996 Nor et al. ...................... 320/109
2008/0040263 A1 * 2/2008 Pollack et al. .................. 705/39

FOREIGN PATENT DOCUMENTS

| JP | 2002140398 A | 5/2002 |
|---|---|---|
| JP | 2005-164604 A | 6/2005 |
| JP | 2007-116799 A | 5/2007 |
| KR | 1998-048444 | 9/1998 |
| KR | 10-1998-073914 | 11/1998 |
| KR | 10-2000-0064646 | 11/2000 |

* cited by examiner

Primary Examiner — George Chen
(74) Attorney, Agent, or Firm — Edwards Wildman Palmer LLP; Peter F. Corless (57) ABSTRACT

An electric charge fee calculation and collection system for an electric vehicle includes a charge control unit that receives power from a power supply means and charges a battery of the vehicle; a power usage amount and cost calculation unit that measures a power usage amount supplied to the battery from the power supply means and calculates an electricity rate corresponding to the measured power usage amount; and a collection means that collects the electricity rate from a user.

9 Claims, 7 Drawing Sheets

Fig. 1

| base rates($/house) | | electricity rates ($/kWh) | |
|---|---|---|---|
| using 100 kWh or less | 0.370 | 100kWh or less | 0.05510 |
| 101~200kWh using | 0.820 | next 100kWh | 0.11380 |
| 201~300kWh using | 1.430 | next 100kWh | 0.16830 |
| 301~400kWh using | 3.420 | next 100kWh | 0.24860 |
| 401~500kWh using | 6.410 | next 100kWh | 0.36640 |
| using higher than 500 kWh | 11.750 | higher than 500 kWh | 0.64390 |

SYSTEM FOR CALCULATING AND COLLECTING ELECTRIC CHARGE FEE FOR ELECTRIC VEHICLE

CROSS-REFERENCE TO RELATED APPLICATION

This application claims under 35 U.S.C. §119(a) the benefit of Korean Patent Application No. 10-2008-0067235 filed on Jul. 10, 2008, the entire contents of which are incorporated herein by reference.

BACKGROUND OF THE INVENTION

The present invention relates to a system for calculating and collecting an electric charge fee for an electric vehicle.

An electric vehicle is a vehicle which uses electricity as its primary or secondary source of power, including hybrid electric vehicle (HEV) and fuel cell electric vehicle (FCEV).

A battery of an electric vehicle, when discharged, can be replaced with a charged battery. In case of a plug-in electric vehicle, it can be charged by inserting a plug provided in the electric vehicle into an electric outlet at various places including a commercial, public and residential place such as a commercial building, a public parking place, a residential house, etc. To facilitate such plug-in charging, a charging infrastructure for electric vehicles is required. In addition, a convenient system for calculating and collecting electric charge fee is required.

The above information disclosed in the Background section is only for enhancement of understanding of the background of the invention and therefore it may contain information that does not form the prior art that is already known in this country to a person of ordinary skill in the art.

SUMMARY OF THE INVENTION

In one aspect, the present invention provides a system for calculating and collecting an electric charge fee for an electric vehicle, which comprises a charge control unit, a power usage amount and cost calculation unit, and a collection means. The charge control unit may receive power from a power supply means for charging a battery of a vehicle. The power usage amount and cost calculation unit may measure a power usage amount supplied to the battery from the power supply means and calculate an electricity rate corresponding to the measured power usage amount. The collection means may collect the electricity rate from a user.

Preferably, the charge control unit may comprise a plug that is to be electrically connected to the power supply means and a charge unit which charges the battery by using power supplied from the power supply means while being connected with the plug.

Preferably, the power usage amount and cost calculation unit may comprise a power usage amount measuring unit, a database, and an electricity rate calculation unit. The power usage amount measuring unit may measure a power usage amount supplied from the power supply means to the battery. The database may store information about electricity rate according to power usage amount. The electricity rate calculation unit may calculate an electricity rate for a preset time period or at each charge from a power usage amount for a preset time period or at each charge, on the basis of the information stored in the database.

Suitably, the system may further comprise a double metering blocking unit which delivers a metric prohibition request signal to the power supply means. The metric prohibition request signal may include a power usage amount of a vehicle and specific information of the vehicle. Accordingly, the metric prohibition request signal may be transmitted together with a power usage amount of a vehicle and specific information of the vehicle.

Suitably, the power supply means may comprise: an outlet that is to be electrically connected to the plug of the charge control unit; a power supply unit that supplies power to a power use device (e.g., general electric appliances, an electric vehicle) through the outlet; a metering unit that measures a power usage amount supplied to the power use device from the power supply unit; a data receiving unit that receives the metric prohibition request signal from the double metering blocking unit; a database which stores the power usage amount and the specific information of the vehicle included in the metric prohibition request signal; and a power usage amount calculation unit which deducts the power usage amount included in the metric prohibition request signal from the power usage amount measured in the metering unit.

In an embodiment, the collection means may comprise a date transmission unit, a data receiving unit, and a controller. The data transmission unit may deliver an electricity rate generated in a preset time period or at each charge to an electronic payment means of a user for payment request. The data receiving unit may receive an electricity rate payment success signal or an electricity rate payment failure signal from the electronic payment means. The controller may update the electricity rate record for a preset period stored in the database 24 with the newly paid electricity rate if the payment success signal is received from the electronic payment means, while it may deliver a charge prohibition request signal to the charge control unit if the payment failure signal is received from the electronic payment means.

In another embodiment, the data transmission unit may deliver an electricity rate generated in a preset time period or at each charge to a cellular phone center or a vehicle information center for payment request. In this embodiment, the cellular phone center or the vehicle information center may deliver a power usage amount by preset period of a particular vehicle to a power supply company center such that the power supply company center may compare it with the power usage amount and the metric prohibition request signal including the specific information of the vehicle received from the power supply means.

With the systems, electric charge fee can be paid in a convenient and secured manner without dual billing problem.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

Figure 1:
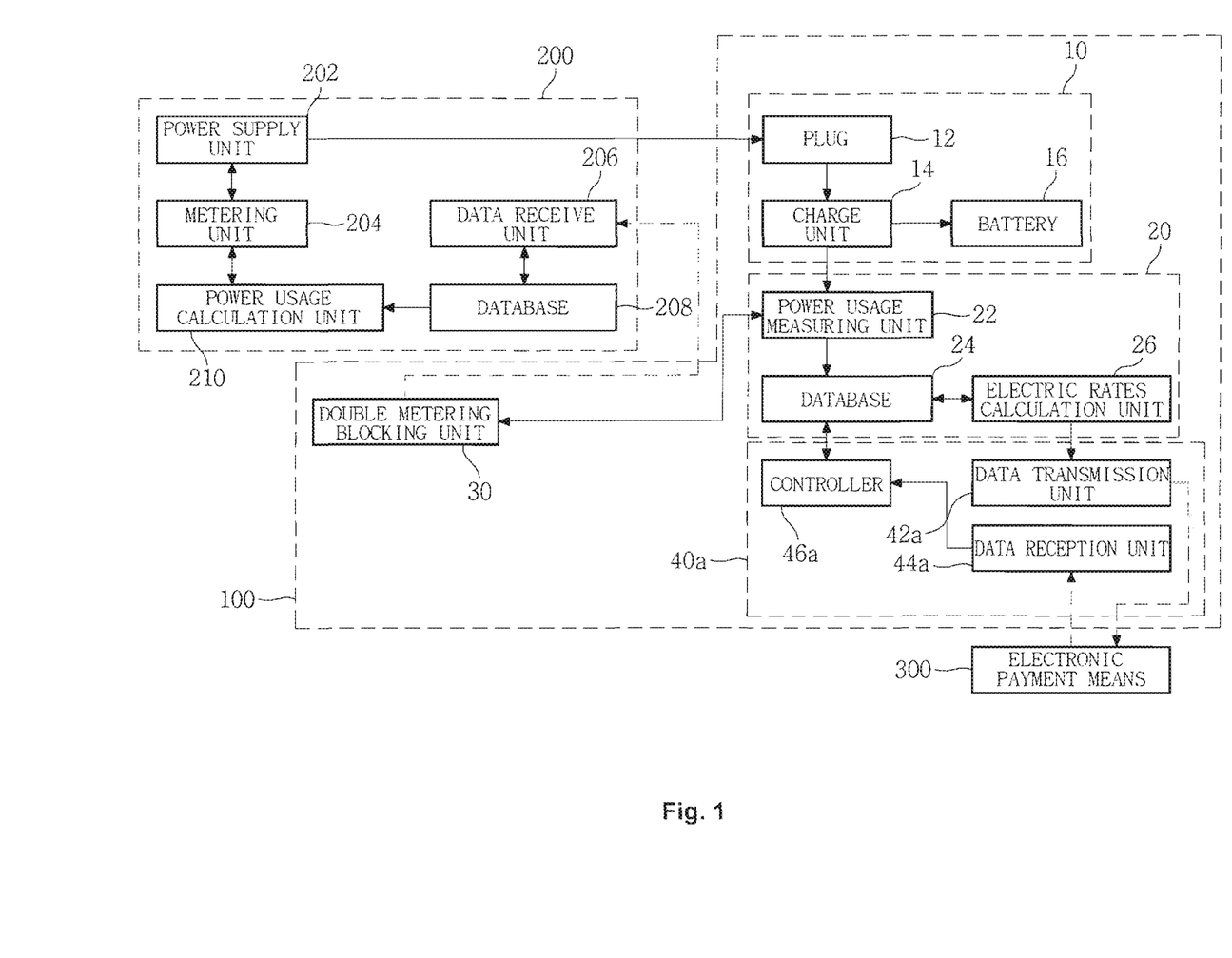
FIG. 1 is a block diagram of a system for calculating and collecting an electric charge fee for an electric vehicle according to an embodiment of the present invention.

Hereinafter, exemplary embodiments of the present invention will be described in detail with reference to the attached drawings FIG. 1 is a block diagram according to a system 100 for calculating and collecting an electric charge fee for an electric vehicle according to an embodiment of the present invention.

As shown in FIG. 1, the system 100 includes a charge control unit 10, a power usage amount and cost calculation unit 20, a double metering blocking unit 30 and a collection means 40a, 40b.

The charge control unit 10 includes a plug 12 and a charge unit 14. The plug 12 can be connected to an electric motor of a vehicle for supplying power to the electric motor. The plug 12 can be inserted into an outlet of a power supply means 200.

The power supply means 200 serves to supply to the vehicle (and other appliances) the power supplied from a power company, a self-generator, and the like.

The power supply means 200 includes an outlet (not shown), a power supply unit 202, a metering unit 204, a data receiving unit 206, a database 208 and a power usage calculation unit 210.

The outlet of the power supply means 200 may be installed in various commercial, residential, public and private places (e.g., parking lot, roadside, park, home, etc.). A user can insert the plug 12 into the outlet for electric charging.

The power supply unit 202 of the power supply means 200 supplies the power to the plug 12 through the outlet.

The metering unit 204 of the power supply means 200 measures the power usage amount supplied from the power supply unit 202. As the outlet can be used for supplying power to general electric appliances as well as to vehicles, the total power usage amount measured by metering unit 204 may include the power usage amount for vehicles and the power usage amount for general electric appliances.

The data receiving unit 206 of the power supply means 200 receives from the double metering blocking unit 30 a metric prohibition request signal with specific information of a vehicle(s) and a power usage amount of the vehicle(s), as described later.

The database 208 of the power supply means 200 stores the metric prohibition request signal such that the power usage amount of a specific vehicle can be determined.

The power usage amount calculation unit 210 of the power supply means 200 deducts the power usage amount included in the metric prohibition request signal from the total power usage amount measured in the metering unit 204. For example, if the total amount measured in the metering unit 204 is 300 kwh and the power usage amount included in the metric prohibition request signal is 70 kwh, 230 kwh is charged to an electric company providing the power.

In the meantime, the charge unit 14 of the charge control unit 10 charges a battery 16 of the vehicle by using the power supplied from the power supply means 200 while being connected to the plug 12. Here, if a charge prohibition request signal is delivered from the collection means 40a, 40b which will be described later, then, the charge unit 14 prohibits the charging of the battery 16. If a charge prohibition cancel signal is delivered from the collection means 40a, 40b, the charge unit 14 resumes the charging of the battery 16.

The power usage amount and cost calculation unit 20 includes a power usage measuring unit 22, a database 24 and an electricity rate calculation unit 26.

The power usage measuring unit 22 measures the power usage amount supplied from the power supply means 200 to the battery 16. The database 24 stores information about electricity rate by power usage amount. The electricity rate calculation unit 26 calculates a power usage amount for a preset period or a power usage amount for each charge by the information stored in the database 24.

Figure 2:
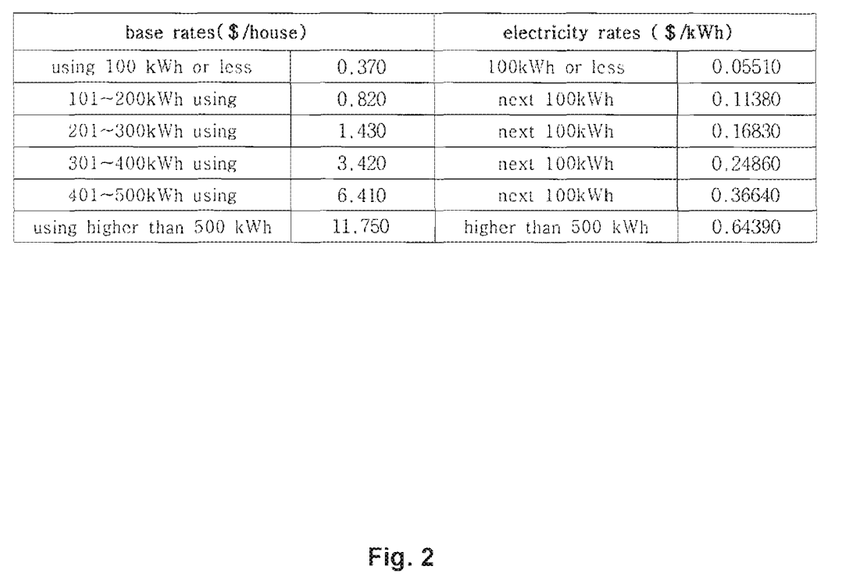
FIG. 2 is an exemplary table of electricity rates according to power usage amounts.

FIG. 2 is an example of an electricity rate table by power usage amount stored in the database 24. For example, if the total power usage amount used for one month is 151 kwh, the electricity fee including base rate is calculated as $131.338: (100 kwh×$0.05510+(51 kwh×$0.1138)+$0.820.

In the meantime, the double metering blocking unit 30 delivers to the power supply means 200 the metric prohibition request signal for the power usage amount. That is, the double metering blocking unit 30 generates the metric prohibition request signal, together with the power usage amount supplied from the power supply means 200 to the battery 16 which is measured by the power usage amount and cost calculation unit 20, and with specific information of the vehicle The double metering blocking unit 30 delivers the generated metric prohibition request signal to the power supply means 200 at the time the battery 16 is fully charged or the plug 12 of the charge control unit 10 is separated from the outlet of the power supply means 200.

The collection means 40a, 40b may include, for example, a card reader (not shown) or a communications terminal (not shown). In case where the collection means 40a, 40b includes the card reader, suitably, the electricity rate calculated in the power usage amount and cost calculation unit 20 may be collected from an electronic money charge card (e.g., a bus card).

Preferably, the collection means 40a, 40b may request the payment of the electricity rate to a user at a preset particular time point by using an additional guide unit (not shown). For example, it may request the payment once a month, at the time when the battery 16 is fully charged, or at the time when the plug 12 of the charge control unit 10 is separated from the outlet of the power supply means 200.

If the payment is not made in spite of a predetermined number of the requests made by the guide unit, the collection means 40a, 40b may deliver the charge prohibition request signal to the charge control unit 10, thereby preventing the charge of the battery 16. Thereafter, if the payment is made, the collection means 40a, 40b may deliver the charge prohibition cancel signal to the charge control unit 10, making it possible to resume the charge of the battery 16.

The collection means 40a includes a data transmission unit 42a, a data reception unit 44a and a controller 46a. The data transmission unit 42a may deliver the generated electricity rate to an electronic payment means 300 of a user and requests the payment. Here, the generated electricity rate may be delivered at a preset time point, such as when the battery 16 is fully charged or when the plug 12 of the charge control unit 10 is separated from the outlet of the power supply means 200.

If the electricity rate is less than the amount of electronic money which has been deposited and is available, the electronic payment means 300 transmits an electricity rate payment success signal after deducting the electricity rate from the amount of electronic money. On the other hand, if the electricity rate is greater than the amount of electronic money, the electronic payment means 300 transmits an electricity rate payment failure signal.

The data reception unit 44a receives the electricity rate payment success signal or the electricity rate payment failure signal from the electronic payment means 300.

In the case of receiving the electricity rate payment success signal from the electronic payment means 300, the controller 46a updates the electricity rate record for a preset period stored in the database 24 with the newly paid electricity rate. Here, the electricity rate payment success signal may include a specific number of the electronic payment means 300 and the electronic money amount corresponding to the paid electricity rate. Accordingly, the controller 46a may deliver the electronic money amount corresponding to the paid electricity rate and the power usage amount to a power supply company 500 such that the electricity rate of the power usage amount can be settled. On the other hand, in the case of receiving payment failure signal is delivered from the electronic payment means 300, the controller 46a delivers the charge prohibition request signal to the charge control unit 10.

Figure 3:
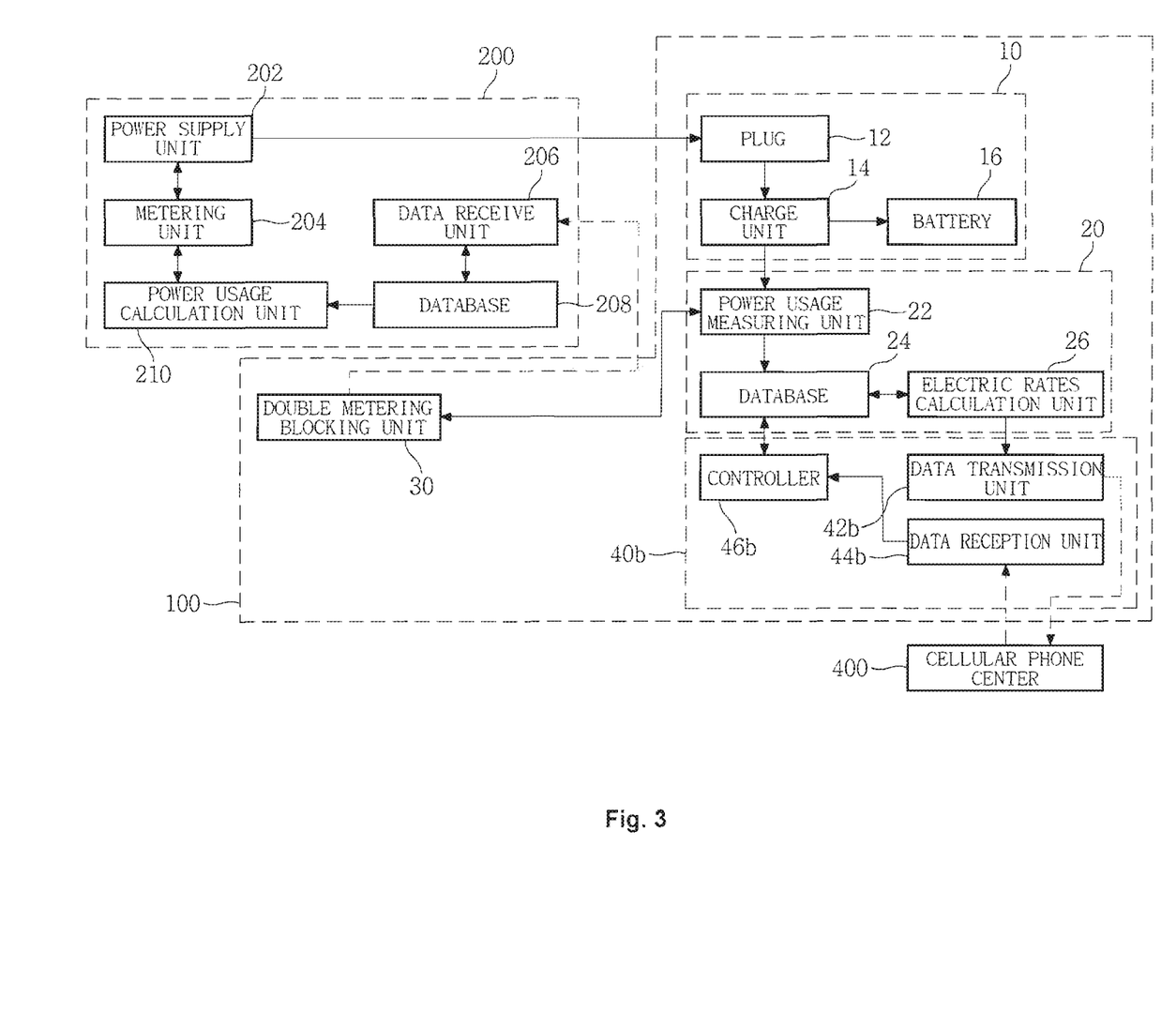
FIG. 3 is a block diagram of a system for calculating and collecting an electric charge fee for an electric vehicle according to another embodiment of the present invention.
Figure 4:
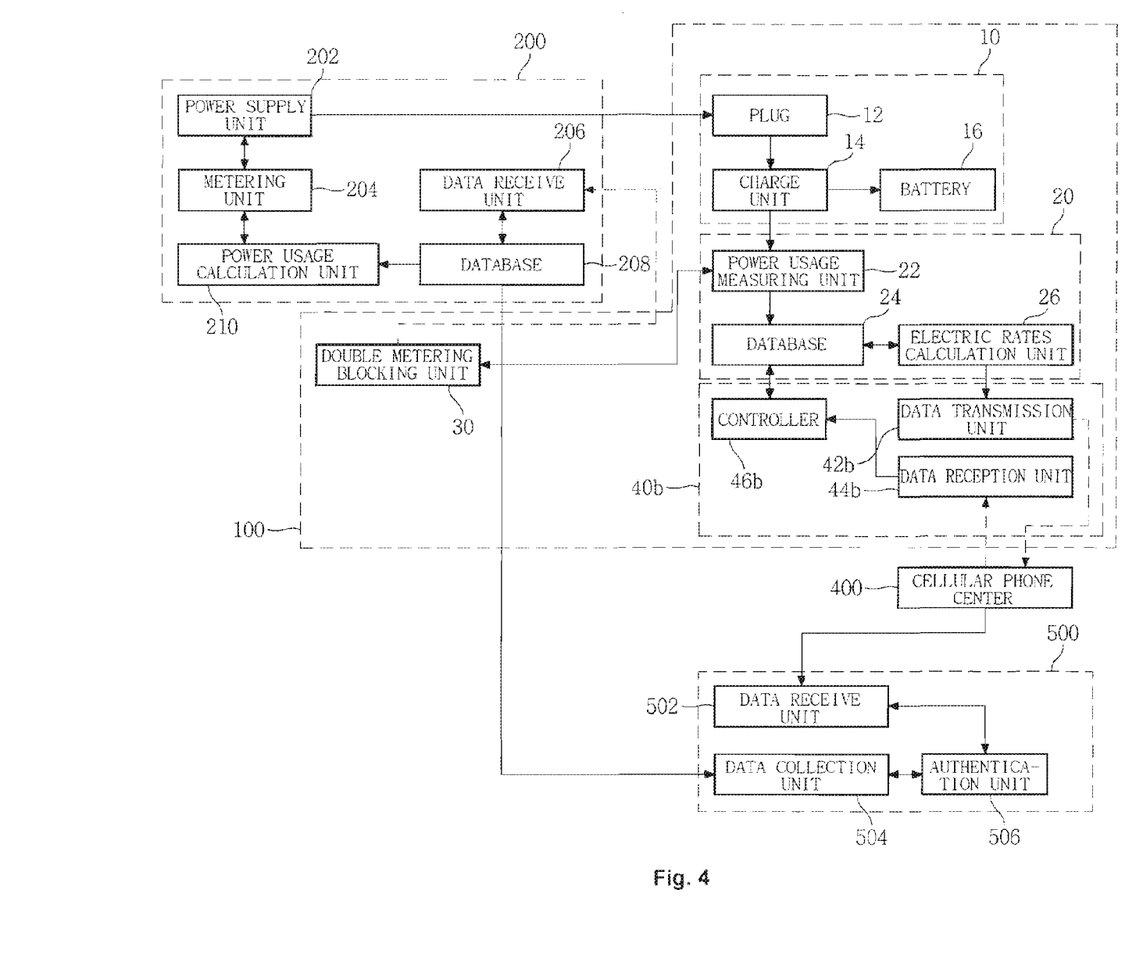
FIG. 4 is a block diagram of a system for calculating and collecting an electric charge fee for an electric vehicle according to still another embodiment of the present invention.
Figure 5:
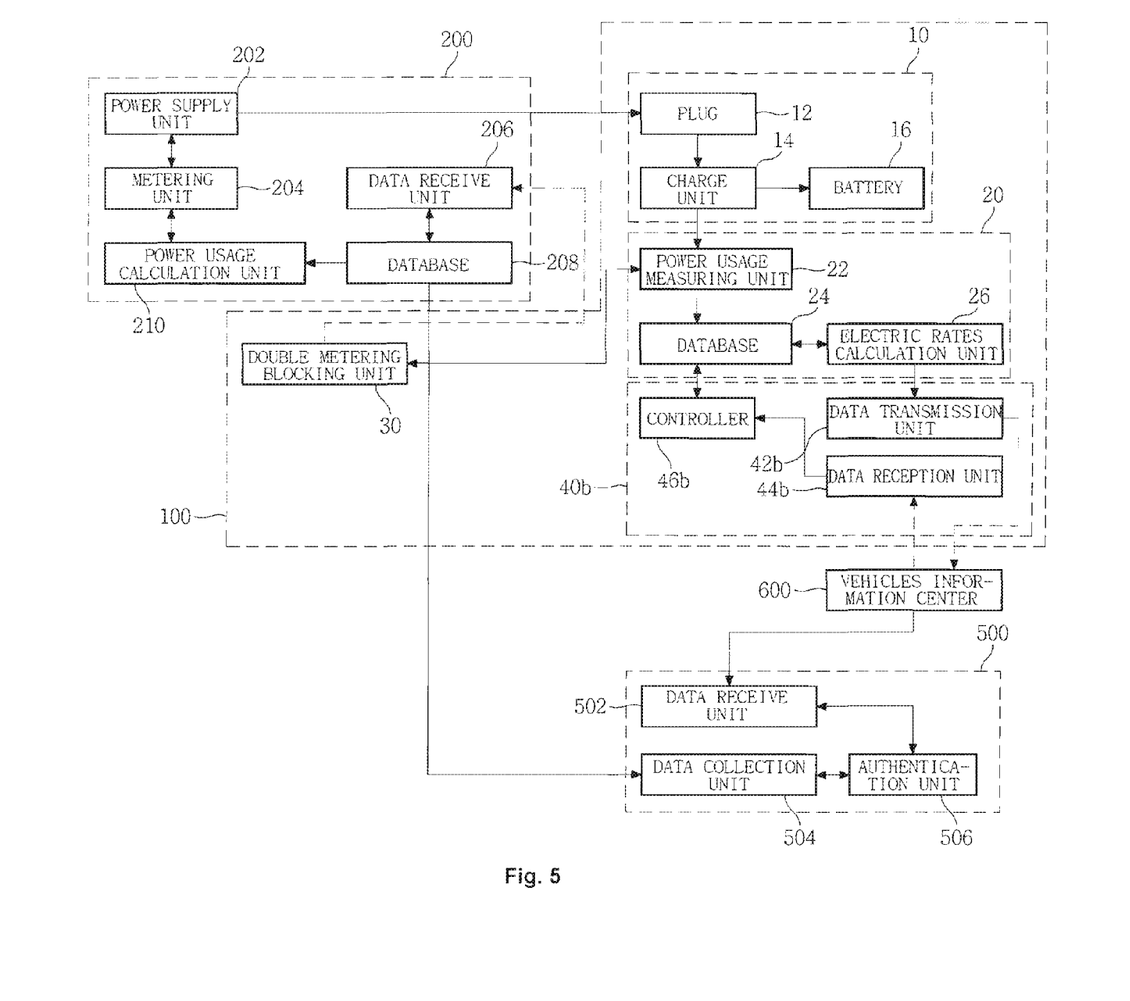
FIG. 5 is a block diagram of a system for calculating and collecting an electric charge fee for an electric vehicle according to still yet another embodiment of the present invention.

In another embodiments, the collection means may include a communications terminal installed in a vehicle, as exemplified in FIGS. 3-5.

Referring to FIGS. 3 to 5, the communications terminal is generally called a "Mozen system", and the Mozen system is equipped with the CDMA communications module and can wirelessly communicate with a cellular phone center 400 or a vehicle information center 600 (Mozen center) with a CDMA mode.

The collection means 40b includes a data transmission unit 42b, a data reception unit 44b and a controller 46b. The data transmission unit 42b delivers the electricity rate generated in a preset time period or at each charge to the cellular phone center 400 or the vehicle information center 600 and requests payment. Here, it is assumed that the owner, for example, of the vehicle has an account in which a certain amount of money has been deposited or can be credited to the owner. If the electricity rate is less than the deposited amount of money or credited amount in the account, the electronic payment means 300 transmits an electric rate payment success signal after deducting the electricity rate. On the other hand, if the electricity rate is greater, the electronic payment means 300 transmits an electricity rate payment failure signal.

The data reception unit 44b receives the electricity rate payment success signal or the electricity rate payment failure signal from the cellular phone center 400 or the vehicle information center 600.

In the case of receiving the electricity rate payment success signal from the cellular phone center 400 or the vehicle information center 600, the controller 46b updates the electricity rate record for a preset period stored in the database 24 with the newly paid electricity rate. Here, the controller 46b may deliver the electronic money amount corresponding to the paid electricity rate and the power usage amount to a power supply company 500 such that the electricity rate of the power usage amount can be settled. On the other hand, in the case of receiving payment failure signal is delivered from the electronic payment means 300, the controller 46b delivers the charge prohibition request signal to the charge control unit 10.

In the meantime, as shown in FIG. 5, the power supply company 500 may need to verify whether the electricity rate delivered from the cellular phone center 400 or the vehicle information center 600 identical to the electricity rate which is actually used.

For this, the power supply company 500 may include a data receiving unit 502, a data collection unit 504 and an authentication unit 506. The power usage amount for a specific vehicle is delivered to the data receiving unit 502 from the cellular phone center 400 or the vehicle information center 600. The data collection unit 504 is connected to the power supply means 200 and receives the power usage amount for a specific vehicle from the database 208 of the power supply means 200. The authentication unit 506 compares the power usage amount for a specific vehicle delivered to the data receiving unit 502 with the power usage amount for a specific vehicle delivered from the data collection unit 504. If a difference between the two power usage amounts exists, the authentication unit 506 may recognize that the system 100 of an electric vehicle is manipulated in an inappropriate and/or illegitimate manner or has an error including a malfunction.

Hereinafter, the operation of the systems 100 will be illustrated.

Figure 6:
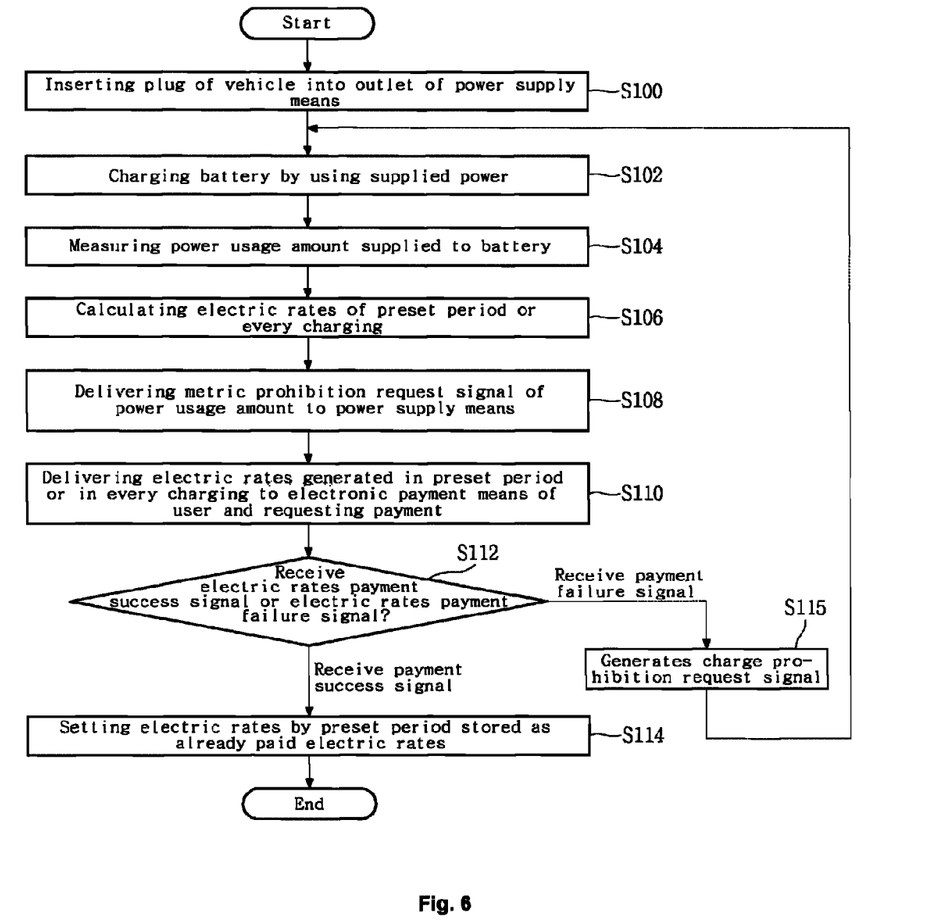
FIG. 6 is a flowchart showing the operation of a system for calculating and collecting an electric charge fee for an electric vehicle according to an embodiment of the present invention.

FIG. 6 is a flowchart showing the operation of a system for calculating and collecting an electric charge fee for an electric vehicle according to an embodiment of the present invention in which the collection means 40a is included.

As shown in FIG. 6, a user inserts the plug 12 of a vehicle into the outlet of the power supply means 200 (S100). The charge unit 14 of the charge control unit 10 charges the battery 16 by using the power supplied from the power supply means 200 (S102). The power usage measuring unit 22 of the power usage amount and cost calculation unit 20 measures the power usage amount supplied to the battery 16 from the power supply means 200 (S104).

The electricity rate calculation unit 26 of the power usage amount and cost calculation unit 20 calculates the electricity rate for a power usage amount for a preset time period or a power usage amount measured in each charge on the basis of the electricity rate table by power usage amount stored in the database 24 (S106). The double metering blocking unit 30 delivers the metric prohibition request signal of the power usage amount to the power supply means 200 (S108).

The collection means 40a guides a user by using the additional guide unit (not shown) in a preset time period or at each charge with regard to the payment of the electricity rate so that the electronic payment means 300 contacts the data transmission/data reception unit of the collection means. The collection means 40a delivers the electricity rate(s) generated to the electronic payment means 300 through the data transmission unit 42a and requests the payment (S110).

The data reception unit 44a of the collection means 40a receives the electricity rate payment success signal or the electricity rate payment failure signal from the electronic payment means 300 (S112).

In the case of receiving the electricity rate payment success signal from the electronic payment means 300, the controller 46a updates the electricity rate record for a preset period stored in the database 24 with the newly paid electricity rate. (S114). On the other hand, in the case of receiving payment failure signal is delivered from the electronic payment means 300, the controller 46a delivers the charge prohibition request signal to the charge control unit 10 (S115).

Figure 7:
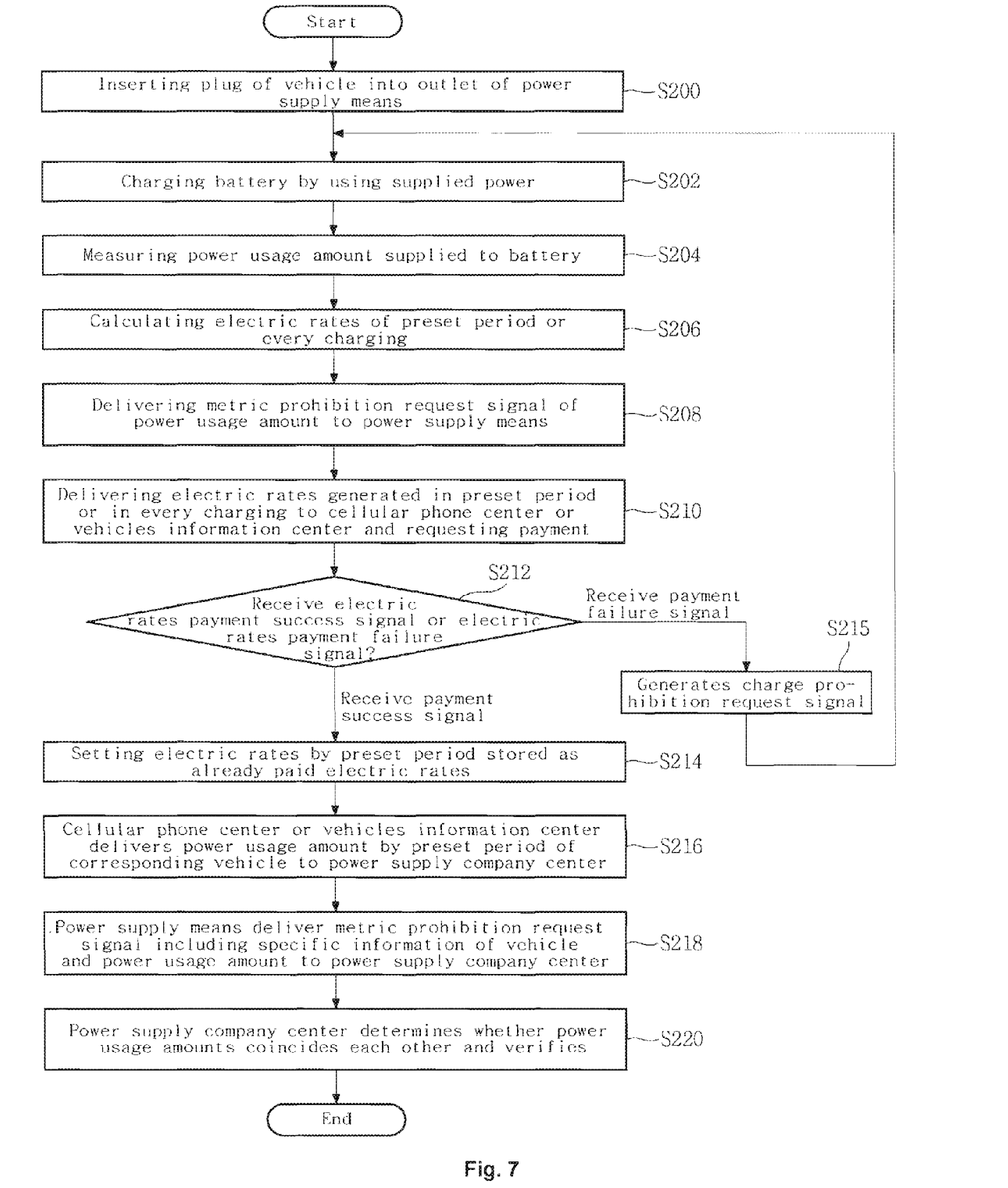
FIG. 7 is a flowchart showing the operation of a system for calculating and collecting an electric charge fee for an electric vehicle according to another embodiment of the present invention.

FIG. 7 is a flowchart showing the operation of a system for calculating and collecting an electric charge fee for an electric vehicle according to another embodiments of the present invention in which in which the collection means 40b is included.

As shown in FIG. 7, a user inserts the plug 12 of a vehicle into the outlet of the power supply means 200 (S200). The charge unit 14 of the charge control unit 10 charges the battery 16 by using the power supplied from the power supply means 200 (S202). The power usage measuring unit 22 of the power usage amount and cost calculation unit 20 measures the power usage amount supplied to the battery 16 from the power supply means 200 (S204).

The electricity rate calculation unit 26 of the power usage amount and cost calculation unit 20 calculates the electricity rate for a power usage amount for a preset time period or a power usage amount measured in each charge on the basis of the electricity rate table by power usage amount stored in the database 24 (S206). The double metering blocking unit 30 delivers the metric prohibition request signal of the power usage amount to the power supply means 200 (S208).

The data transmission unit 42b of the collection means 40b delivers the electricity rate generated in a preset time period or at each charge to the cellular phone center 400 or the vehicle information center 600 and requests payment (S210).

The data reception unit 44b of the collection means 40b receives the electricity rate payment success signal or the electricity rate payment failure signal from the cellular phone center 400 or the vehicle information center 600 (S212).

In the case of receiving the electricity rate payment success signal from the cellular phone center 400 or the vehicle information center 600, the controller 46b of the collection means 40b updates the electricity rate record for a preset period stored in the database 24 with the newly paid electricity rate. (S214). On the other hand, in the case of receiving payment failure signal is delivered from the electronic payment means 300, the controller 46b delivers the charge prohibition request signal to the charge control unit 10 (S215).

The cellular phone center 400 or the vehicle information center 600 delivers the power usage amount for a particular vehicle to the power supply company center 500 (S216). The power supply means 200 delivers the metric prohibition request signal including specific information of the vehicle and a power usage amount to the power supply company center 500 (S218).

The authentication unit 506 of the power supply company center 500 determines and verifies whether the power usage amount of the vehicle received by the receiving unit 502 is identical to the total power usage amount of the vehicle collected by the data collection unit 504 (S220).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A system for calculating and collecting an electric charge fee for an electric vehicle, the system comprising:

a charge control unit that is electrically connected to a battery in the vehicle and charges the battery when the vehicle is connected to an outlet of a power supply means;

a power usage amount and cost calculation unit that measures a power usage amount supplied to the battery by the charge control unit from the power supply means and calculates an electricity rate corresponding to the measured power usage amount;

a collection means that communicates with an electric payment means of a user and collects the electricity rate from the electronic payment means; and a double metering blocking unit that transfers a metric prohibition request signal to the power supply means to prevent metering for the measured power usage amount when the battery is finished charging.

2. The system of claim 1, wherein the metric prohibition request signal includes the power usage amount supplied to the battery of a vehicle and specific information of the vehicle.

3. The system of claim 2, wherein the power supply means comprises:

an outlet that is to be electrically connected to the plug of the charge control unit;

a power supply unit that supplies power to a power use device through the outlet;

a metering unit that measures a power usage amount supplied to the power use device from the power supply unit;

a data receiving unit that receives the metric prohibition request signal from the double metering blocking unit;

a database which stores the power usage amount and the specific information of the vehicle included in the metric prohibition request signal; and a power usage amount calculation unit which deducts the power usage amount included in the metric prohibition request signal from the power usage amount measured in the metering unit.

4. The system of claim 1, wherein the collection means comprises:

a data transmission unit that delivers an electricity rate generated in a preset time period or at each charge to a cellular phone center or a vehicle information center for payment request;

a data receiving unit that receives an electricity rate payment success signal or an electricity rate payment failure signal from the cellular phone center or the vehicle information center; and a controller that updates the electricity rate record for a preset period stored in the database with the newly paid electricity rate if the payment success signal is received from the cellular phone center or the vehicle information center, while delivering a charge prohibition request signal to the charge control unit if the payment failure signal from the electronic payment means.

5. The system of claim 4, wherein the cellular phone center or the vehicle information center delivers a power usage amount by preset period of a particular vehicle to a power supply company center, and the power supply means delivers a power usage amount and the metric prohibition request signal including the specific information of the vehicle to the power supply company center.

6. The system of claim 1, wherein the charge control unit comprises:

a plug that is to be electrically connected to the power supply means; and a charge unit which charges the battery by using power supplied from the power supply means while being connected with the plug.

7. The system of claim 1, wherein the power usage amount and cost calculation unit comprises:
- a power usage amount measuring unit that measures a power usage amount supplied from the power supply means to the battery;
- a database that stores information about electricity rate according to power usage amount; and
- an electricity rate calculation unit that calculates an electricity rate for a preset time period or at each charge from a power usage amount for a preset time period or at each charge, on the basis of the information stored in the database.

8. The system of claim 1, wherein the collection means comprises:
- a data transmission unit that delivers an electricity rate generated in a preset time period or at each charge to an electronic payment means of a user for payment request;
- a data receiving unit that receives an electricity rate payment success signal or an electricity rate payment failure signal from the electronic payment means; and
- a controller that updates the electricity rate record for a preset period stored in the database with the newly paid electricity rate if the payment success signal is received from the electronic payment means, while delivering a charge prohibition request signal to the charge control unit if the payment failure signal is received from the electronic payment means.

9. A system for calculating and collecting an electric charge fee for an electric vehicle, the system comprising:
- a charge control unit is electrically connected to a battery in the vehicle and charges the battery when the vehicle is connected to an outlet of a power supply means;
- a power usage amount and cost calculation unit that measures a power usage amount supplied to the battery from the power supply unit and calculates an electricity rate corresponding to the measured power usage amount;
- a collection unit that collects the electricity rate from a user; and
- a double metering blocking unit that transfers a metric prohibition request signal to the power supply unit to prevent metering for the measured power usage amount when the battery is finished charging.

* * * * *